May 9, 1967  E. G. MORRISON  3,318,424
AIR COOLING MEANS FOR DISC BRAKES
Filed May 6, 1966

INVENTOR
Emmett G. Morrison
BY
Charles H. Redman
Atty.

United States Patent Office 3,318,424
Patented May 9, 1967

---

3,318,424
AIR COOLING MEANS FOR DISC BRAKES
Emmett G. Morrison, 319 Illinois Ave.,
Elgin, Ill. 60120
Filed May 6, 1966, Ser. No. 548,320
2 Claims. (Cl. 188—264)

This application is a continuation-in-part of my copending application Ser. No. 413,376, filed Nov. 23, 1964, and now abandoned.

The invention relates to improvements in disc brakes for vehicles and is particularly concerned with the novel construction and assembly of the brake housing.

Operation of disc brakes, as when the brake shoes are held tightly against the cooperating disc in the brake housing, generate considerable unwanted heat and it is an object of this invention to provide novel means in the brake housing assembly to effectively and promptly dissipate such heat to atmosphere.

Another object is to provide the disc element of a disc brake assembly with a multitude of air vent passages.

Another object is to provide a brake housing assembly which may be partially dismantled quickly to permit manual placement of the brake housing to afford ready access to the brake shoe assembly or caliper.

The structure by means of which the above noted and other objects and advantages of the invention are attained will be described in the following specification, taken in conjunction with the accompanying drawings, showing preferred illustrative embodiments of the invention, in which.

Figure 1:
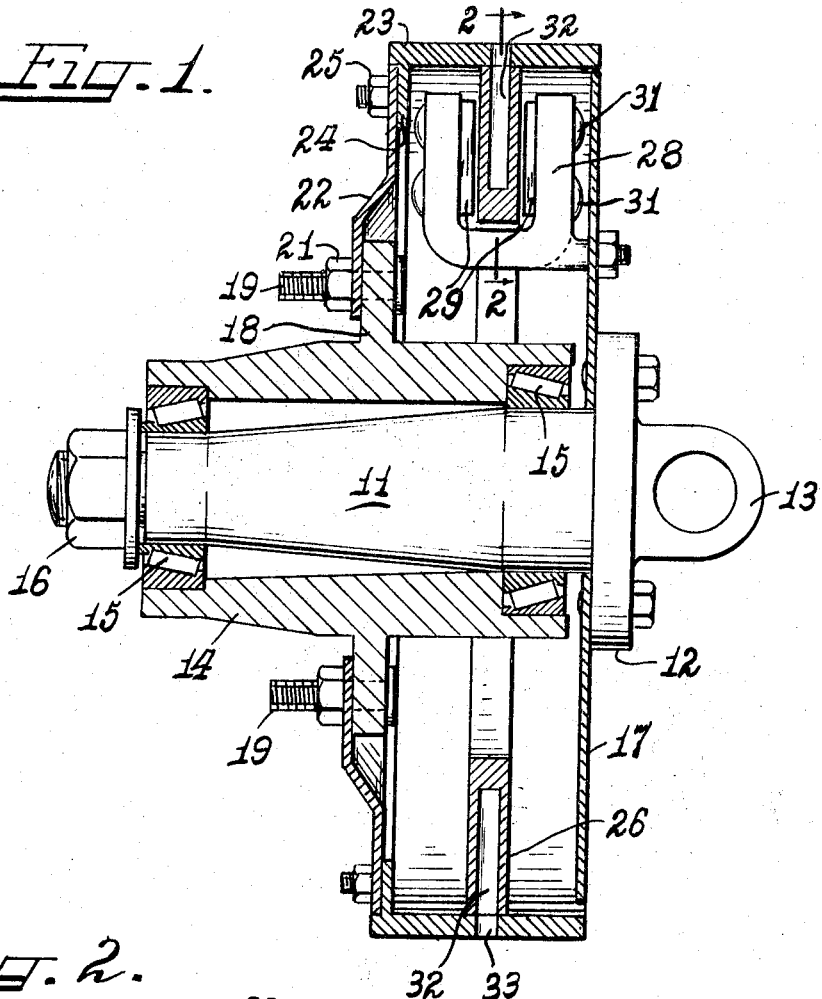
FIG. 1 is a diametrical sectional view of the brake housing assembly, showing the brake caliper assembly in elevation.

In the exemplary embodiments of the invention illustrated in the accompanying drawings, a wheel spindle 11 has a flange 12 at one end carrying an integral pintle pin mounting 13. A hub 14 is journalled on suitable bearings 15 on the spindle and a washer-nut assembly 16 in the other spindle end retains the hub in place thereon. A back plate 17 on the spindle flange affords a closure for the back side of a brake drum assembly to be described presently.

The hub 14 has an external circumferential flange 18 to which is mounted, as by wheel studs 19 and nuts 21, the inner peripheral margin of a circular wall 22.

A brake drum or housing 23 is arranged around the hub and has an inner radial flange 24 thereon which is bolted securely, as by bolts 25, to the outer peripheral margin of wall 22. The housing 23 mounts firmly on its inside circumferential wall, a brake disc 26, said disc being secured to said housing wall by any suitable means such as screws 27. The brake disc is adapted to have cooperative association with a caliper 28 carried by the back plate 17 and also to have mounted thereon a pair of brake shoes or pads 29, one of which is arranged on each side of the brake disc and which are operatively connected in any suitable manner with a hydraulic cylinder-piston assembly indicated at 31. As is well understood in this art, when the brake shoes or pads 29 are urged into tight binding engagement with the opposed faces of the disc 26 rotation of the brake housing is retarded.

Figure 2:
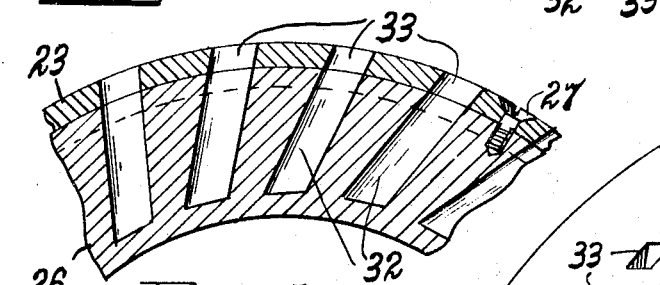
FIG. 2 is a detail sectional view taken substantially on line 2—2 of FIG. 1.
Figure 3:
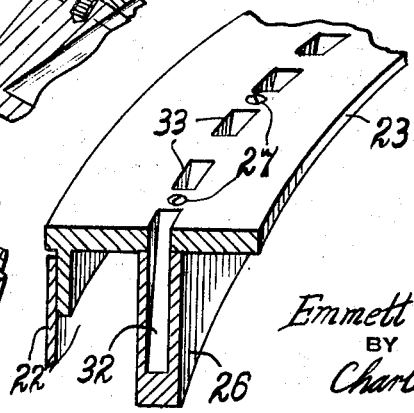
FIG. 3 is a fragmentary perspective view of the brake housing.
Figure 4:
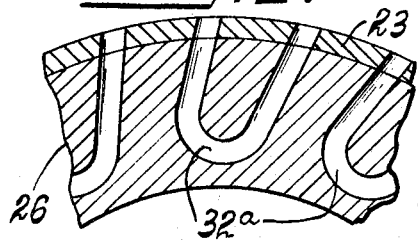
FIG. 4 is a view, similar to FIG. 2, showing a modified structure.

Pressure application of the brake shoes or pads on the brake disc 26 generates excessive heat which must be dissipated. To this end the brake disc is formed with a multitude of circumferentially spaced radial recesses or wells 32 (FIG. 2) which communicate at their open outer ends with aligned holes 33 in the brake housing 23 to convey heat outwardly to atmosphere in the area surrounding the brake housing. The recesses or wells 32 preferably are inclined circumferentially to scoop atmospheric air and aid cooling. In the modification illustrated in FIG. 4, the wells 32a are connected in pairs so as to increase the circulation of air through them. The housing 23 and the brake disc 26 can be cast in one unit.

The assembly of the brake housing 23, wall 22 and hub 14 is such that, when repairs or replacement of the brake shoe assembly is required, the wall 22 may be disconnected from the hub 14 and from brake housing 23 and removed. This leaves the brake housing free or floating so that it may be lifted up over the caliper and moved into a position most advantageous to the workman while replacing the shoes in the caliper which may be removed without disconnecting the hydraulic line or may be left in place on the back plate 17.

Although I have described preferred embodiments of my invention, in considerable detail, it will be understood that the description thereof is intended to be illustrative, rather than restrictive, as details of the structure may be modified or changed without departing from the spirit or scope of the invention. Accordingly, I do not desire to be restricted to the exact construction described.

I claim:

1. In a vehicle brake assembly, a spindle, a wheel hub mounted on said spindle, an external circumferential flange on said hub, a circumferential brake housing surrounding said hub, a wall connecting said brake housing with the hub flange, an internal circumferential flange in said brake housing, a plurality of circumferentially spaced substantially radial recesses in said internal circumferential flange, said recesses being closed on their inner ends and opening onto the outer circumferential surface of said internal flange, and the brake housing having openings therein in register with said recesses.

2. The assembly recited in claim 1, in which the recesses are arranged in pairs with a flow connection between the closed inner ends of the recesses of each pair.

References Cited by the Examiner

UNITED STATES PATENTS

| 880,266 | 2/1908 | Ast. | |
|---|---|---|---|
| 2,349,928 | 5/1944 | Ash | 188—18 X |
| 2,655,236 | 10/1953 | Bachman | 188—264 |
| 2,771,966 | 11/1956 | Davey | 188—218 |
| 3,000,470 | 9/1961 | Milan | 188—218 X |

FOREIGN PATENTS

| 1,007,936 | 2/1952 | France. |
|---|---|---|
| 456,389 | 4/1950 | Italy. |

MILTON BUCHLER, Primary Examiner.

FERGUS S. MIDDLETON, Examiner.

G. E. HALVOSA, Assistant Examiner.